Nov. 28, 1939.  A. HERR  2,181,552
VEHICLE OPERATED OVERHEAD DOOR
Filed Dec. 9, 1938  3 Sheets-Sheet 1
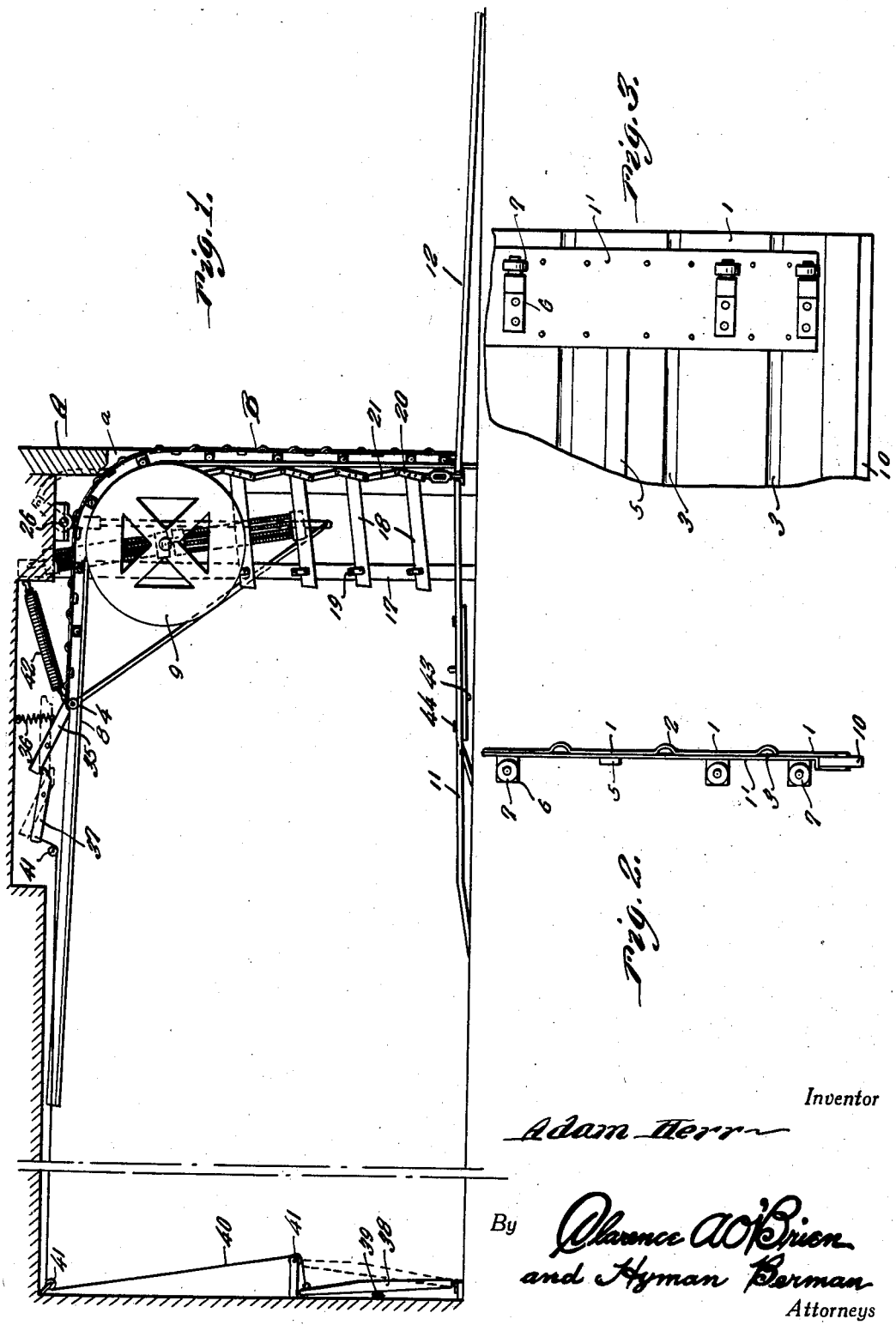
Inventor
Adam Herr
By Clarence A. O'Brien
and Hyman Berman
Attorneys

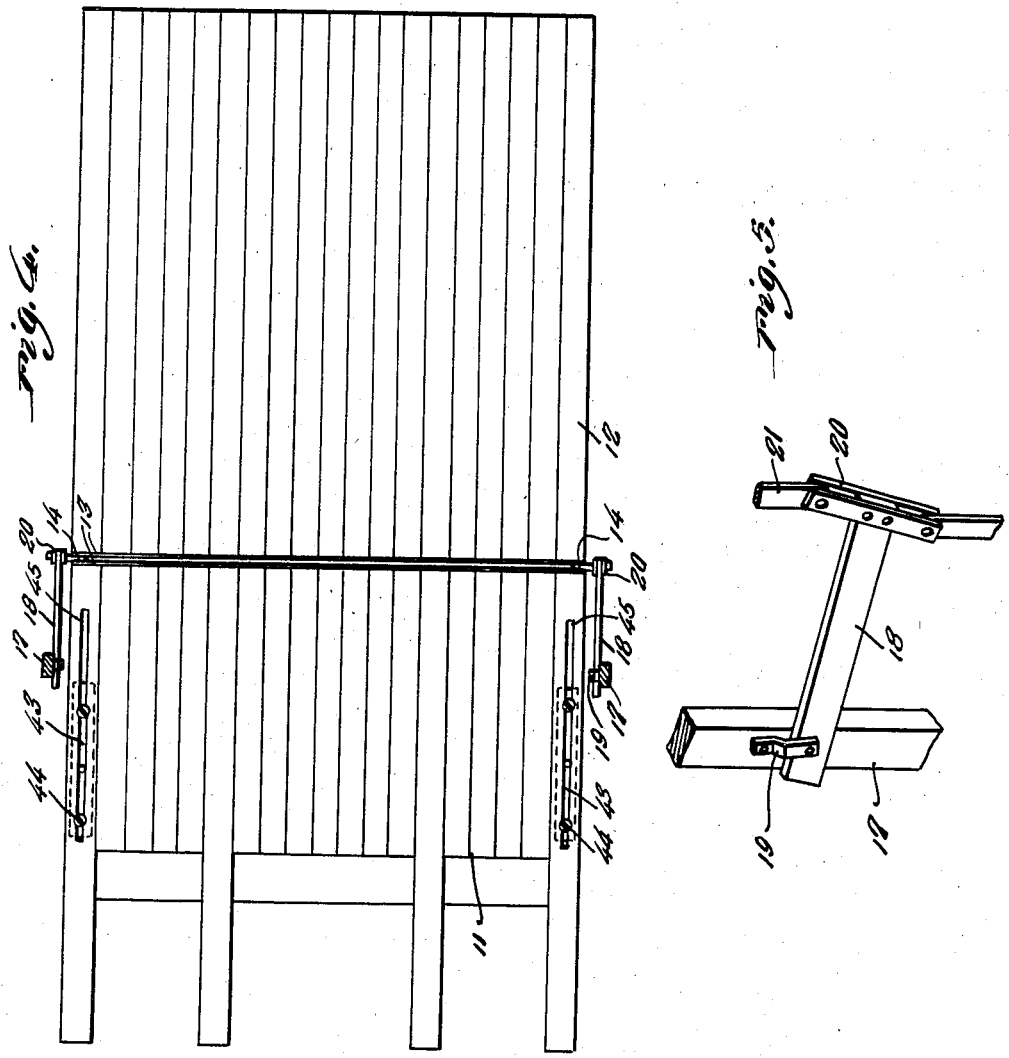

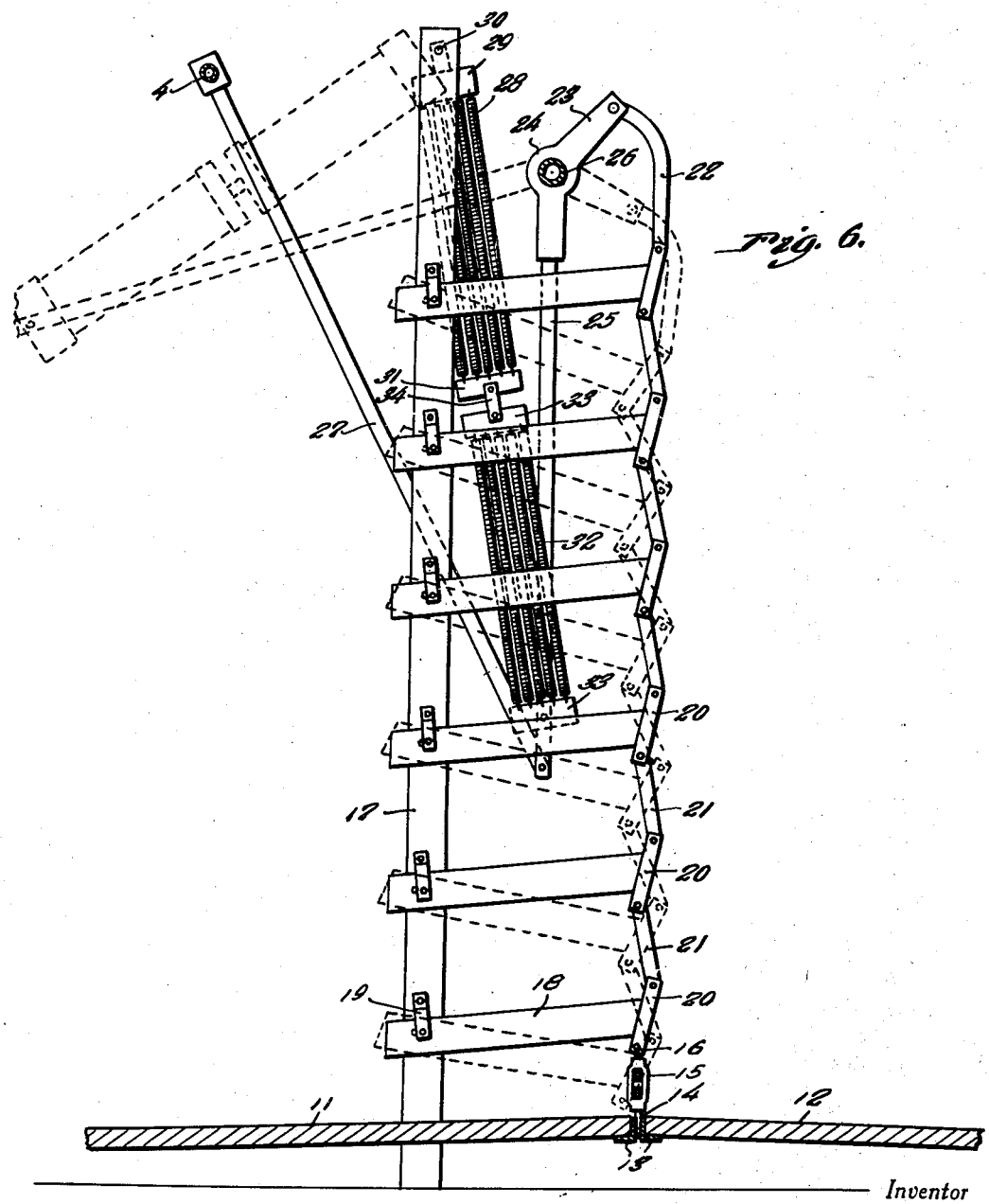

Patented Nov. 28, 1939

2,181,552

UNITED STATES PATENT OFFICE 2,181,552

VEHICLE OPERATED OVERHEAD DOOR

Adam Herr, Sheboygan, Wis., assignor of one-half to John Herr, Sheboygan, Wis.

Application December 9, 1938, Serial No. 244,849

2 Claims. (Cl. 268—31)

This invention relates to a garage door, the general object of the invention being to provide means for opening the door by a vehicle moving toward the door either from the exterior of the garage or while the vehicle is in the garage, with means for locking the door in closed position by movement of the vehicle to a position where its bumper will strike a lever at the rear of the garage.

Another object of the invention is to make the door of such construction that it can move over vertical and horizontal portions of track members and wheels which cause the door parts to move from the vertical parts of the track members to the horizontal parts and vice versa.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a vertical sectional view through parts of a garage constructed in accordance with this invention.

Figure 2 is a fragmentary vertical sectional view through the door.

Figure 3 is a fragmentary elevation looking toward a pair of uprights in section.

Figure 4 is a plan view of the treadle members with a pair of uprights in section.

Figure 5 is a fragmentary perspective view showing how a pivoted arm is connected with the link arrangement forming part of the door operating means.

Figure 6 is an elevation with parts in section of the door operating means at one side of the garage.

In these drawings the letter A indicates a portion of a garage which is provided with the door opening a and the door is shown at B and is formed of a plurality of transversely extending sheets 1, of flexible metal, suitably connected together. Transversely extending grooves 3 are formed in the inner face of the door, which form beads 2 on the exterior face. A transversely extending bar 4 is connected to the upper edge of the door and flexible metal strips 1' are connected to the inner face of the door adjacent the side edges thereof. The door is reinforced on the inner faces by the members 5 which extend only as far as the strip 1' and brackets 6 are bolted to the strips 1' and carry the rollers 7 for engaging track members 8 and the wheels 9. Each track member includes a vertical part arranged at a side wall of the door opening and a substantially horizontal part with the wheels 9 arranged to convey the door from the vertical parts of the track members to the horizontal parts and vice versa. A weather strip 10 of rubber or the like is attached to the lower edge of the door as shown in Figure 2.

An inner treadle member 11 and an outer treadle member 12 are suitably supported for rocking movement so that they will be depressed by a vehicle approaching the door from the exterior of the treadle members rest on the inverted T-iron 13 to which a pair of screw-threaded rods 14 are connected and each rod has a turnbuckle 15 threaded thereto which is also threaded to a rod 16. Uprights 17 are arranged in the garage, one on each side thereof adjacent the door opening and each upright has pivoted thereto a plurality of arms 18 which are arranged in a vertical row, each arm being pivoted to the upright by a clip 19 having one end pivoted to the arm and the other to the upright as shown more particularly in Figure 5. A pair of inclined plates 20 is rigidly fastened to the outer end of each arm 18 and the lowermost pair is pivotally connected with the rod 16 and a link 21 connects each pair of links 20 with a second pair. A curved bar 22 is connected with the plates 20 of the upper arm and the upper end of this member is pivoted to a short arm 23 of a member 24 which also carries a long rod or arm 25. These two members 24 are fastened to a shaft 26 supported for rocking movement in the upper portion of the garage slightly in rear of the top of the door opening. The lower ends of the arms 25 are connected by the rods 27 with the ends of the bar 4 connected with the upper edge of the door. A group of springs 28 is connected together at their upper ends by a clip 29 which is pivoted to a part of the garage as shown at 30 and a clip 31 is connected to the lower ends of the springs 28. A second group of springs 32 have their ends connected to the clips 33 and the adjacent clips 31 and 33 are connected together by links 34. It will, of course, be understood that a set of this spring assembly is located at each side of the garage and the lower clip 33 is pivotally connected to a rod 25 as shown in Figure 6.

These parts are so arranged that when either of the treadles is depressed by the weight of a vehicle, the arms 18, plates 20 and links 21 will exert a pull upon the arms 23 of the members 24 so as to swing the rods or arms 25 upwardly which will cause the rods 27 to force the bar 4 toward the rear of the garage which, of course, moves the door upwardly to open position. The groups of springs 28 and 32 act to counterbalance the weight of the door so as to facilitate movement thereof during the opening movement.

A spring 42 is conected to the central portion of the bar 4 and to a part of the garage and acts to close the door as soon as the vehicle leaves a treadle and the inner treadle 11, of course, must be so constructed and arranged that the car can pass therefrom after it enters the garage to permit the door to close.

In order to lock the door in closed position after the car has entered the garage I provide the pivotally supported latch member 35 for engaging the upper end of the door when the same is in closed position to prevent opening movement of the door but this latch member is normally held in inoperated position by a spring 36. A trip bar 37 is pivoted intermediate its ends in the garage with its front end located under the rear end of the latch member 35. A vertically arranged lever 38 is hinged at its lower end to a support at the rear wall of the garage and is normally pressed outwardly by a spring. This lever 38 has a cable 40 attached to its upper edge, the cable being connected to the rear end of the trip bar 37 and is guided by the pulleys 41. These parts are so arranged that when the bumper of the car strikes the lever 38 the cable 40 will be pulled upon which rocks the bar 37 on its pivot and causes said bar to lower the front end of the latch member 35 so that said front end will be in the path of movement of the upper end of the door so as to prevent movement toward opening position of the door. However, as soon as the car is moved away from the lever 38 the spring 36 will move the latch bar 35 out of the path of movement of the door so that the door can be opened.

From the foregoing it will be seen that the door is normally in closed position and the latch member 35 in releasing position and when a vehicle approaches the door opening it will depress the exterior treadle 12 which causes the door to open, as before described, so that the vehicle can be driven into the garage. As soon as the vehicle leaves the interior treadle the spring 42 will close the door and upon further movement of the vehicle to a point where its bumper will strike the lever 38 the latch member 35 is moved to operative position so as to hold the door in closed position. Then when it is desired to move the vehicle out of the garage upon the first movement toward the door of the vehicle its bumper will free the lever 38 which permits the spring 36 to move the latch member 35 to inoperating position and then the vehicle moves upon the interior treadle to open the door and the door remains open until the vehicle has passed through the door opening and off of the exterior treadle 12.

A weight 43 is slidably connected to each side of the internal treadle 11 through means of the bolts 44 passing through the slots 45 in the side parts of the treadle. These weights can be adjusted forwardly and rearwardly by loosening the bolts and then tightening the bolts after the weights have been properly adjusted. These weights are used when snow or the like collects on the exterior treadle 12 which might move the door to open position if it was not locked, but by adjusting the weights to overcome the weight of the snow this will be prevented.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a door structure, track members including vertical and horizontal sections and arcuate parts between the sections, a flexible door having edge parts moving over the track sections, treadles, an upright, a plurality of arms arranged in a vertical row, each having one end pivoted to the upright, inclined plates connected to the other ends of the arms, links connecting the plates together, means conecting the lower plate to the adjacent ends of the treadles, a member supported for rocking movement and having a short arm and a depending long arm, means for connecting the short arm to the upper plate, a link connecting the lower end of the long arm to the upper end of the door and a spring arrangement connecting the lower end of the long arm to a stationary part.

2. In a door structure, track members including vertical and horizontal sections and arcuate parts between the sections, a flexible door having edge parts moving over the track sections, treadles and door actuating means operated by depressions of the treadles, said means including a vertical row of substantially horizontal arms spaced apart, clips to which one end of the arms are pivoted and the clips being pivotally connected to a part of the structure, oppositely and outwardly sloping plates connected to the other ends of the arms, links pivotally connecting the plates together, means for connecting the lower plate to the treadles and means for imparting movement of the top link to the door.

ADAM HERR.